United States Patent [19]

Natzel et al.

[11] Patent Number: 4,650,145
[45] Date of Patent: Mar. 17, 1987

[54] SLIDER MECHANISM

[75] Inventors: Jerome W. Natzel, Owatonna; Harvey M. Urch, West Concord; Jerry A. Wenger, Owatonna, all of Minn.

[73] Assignee: Wenger Corporation, Owatonna, Minn.

[21] Appl. No.: 785,131

[22] Filed: Oct. 7, 1985

[51] Int. Cl.[4] .............................................. F16M 11/00
[52] U.S. Cl. .................................... 248/414; 248/125; 248/188.5; 248/333; 403/104; 403/374
[58] Field of Search ............ 248/414, 412, 125, 188.5, 248/333, 337, 157, 161, 449; 403/374, 104

[56] References Cited

U.S. PATENT DOCUMENTS

| 1,859,223 | 5/1932 | Stevenson . | |
| 1,919,114 | 7/1933 | Ley | 248/414 X |
| 2,291,747 | 8/1942 | Neuwirth | 248/191 |
| 3,265,346 | 8/1966 | Petrick | 248/414 |
| 3,941,492 | 3/1976 | Meinunger | 403/104 |
| 4,278,223 | 7/1981 | Fauteux | 248/414 X |
| 4,329,800 | 5/1982 | Shuman | 403/104 X |
| 4,526,334 | 7/1985 | Rantakari | 248/412 X |

FOREIGN PATENT DOCUMENTS 1138172  12/1968  United Kingdom ................ 248/412

Primary Examiner—Ramon O. Ramirez
Attorney, Agent, or Firm—Wood, Dalton, Phillips, Mason & Rowe

[57] ABSTRACT

A self-locking slider mechanism for holding telescoping relatively-movable inner and outer tubular members in adjusted lengthwise position and which requires a greater force manually applied lengthwise of the members to decrease the over-all length of the members than to increase the over-all length thereof. The members can be used as a stand to provide a load-carrying capacity for the stand while still enabling adjustment of stand height with minimal effort. The slider mechanism has a body member attached to one tubular member and having an internal recess extending lengthwise thereof and opening to one side of the body with an inclined ramp plate mounted within the recess and associated with a ramp member movable therealong and which has a friction member engageable with the other tubular member. A plurality of compression springs are associated with the ramp plate and the ramp member and the ramp plate is inclined whereby a force tending to lower the height of the stand as by a load carried by the stand is reacted against relatively stiff compression springs associated with the ramp plate. A force tending to increase the over-all length of the tubular members is resisted by a lesser spring force acting on the ramp member and the ramp member moves downwardly along the inclined ramp plate to reduce the pressure applied by the friction member.

17 Claims, 6 Drawing Figures

SLIDER MECHANISM

BACKGROUND OF THE INVENTION

This invention pertains to a slider mechanism and, more particularly to such a mechanism which is self-locking and which can be used to hold telescopically adjustable members of a leg or stand in adjusted height position. The self-locking slider mechanism has a friction member movably mounted on one tubular member and frictionally engaging a second tubular member. The friction member has means associated with it to require a greater force manually applied lengthwise of the stand or leg to decrease the length thereof than to increase the length thereof, whereby height adjustment may be achieved while supporting a load. One use is for a music stand wherein a desk will support musical scores while still enabling manual height adjustment. The slider mechanism is also usable in other types of stands and adjustable leg structures.

DESCRIPTION OF THE PRIOR ART

Many different types of mechanism are known for holding a stand in adjusted height position. These mechanisms can either be of the type which are mechanically moved into and out of a positive locked condition or of a type which frictionally holds components of the stand in an adjusted height position. For many uses, a stand of the latter type is preferred when relatively light loads are supported by the stand and ease of stand height adjustment is an important consideration.

In stands of the latter type, there are several different known structures for holding the stand in adjusted height position. With the stand having inner and outer tubular members, one structure has had a series of spring fingers mounted on one of the tubular members and frictionally engaging the other tubular member. Another structure has had a split plastic collar associated with one tubular member and spring-urged into engagement with the other tubular member. In these friction structures, there must be sufficient frictional resistance to enable the stand to support the necessary load and, in adjusting the height of the stand, this frictional resistance must be overcome. This is no problem when the height of the stand is to be decreased, since the base of the stand will merely be pressed against the floor. However, in increasing the height of the stand, it is necessary to hold one tubular member of the stand while the other tubular member is being pulled to cause relative movement therebetween. Therefore, minimizing the amount of force required to increase the height of the stand is desirable.

The invention disclosed hereinafter provides for a slider mechanism usable in many different types of stands and adjustable leg structures which require a greater force manually applied lengthwise of the device to decrease the height of the stand or the leg structure than to increase the length thereof whereby the device may perform its intended function of supporting a required load while requiring minimal force to increase the height thereof. The invention also provides for controlled lowering movement.

SUMMARY OF THE INVENTION

The primary feature of the invention disclosed herein is to have a slider mechanism which may be usable in many types of stands and adjustable leg structures that are capable of supporting any device or apparatus requiring length or height adjustment.

In accomplishing the foregoing, the components of the invention can be selected and sized to fit the tubular members of the stand or leg structure, to provide sufficient pressure and, therefore, frictional resistance to support a varied number of loads.

Additional features of the invention reside in the fact that the components of such an invention are comparatively low cost and the invention eliminates the need for expensive locking collars, manual locking collars, and counterbalances; yet the invention holds the designed weight.

The features of the invention which allows it easy up, frictional resistance down, when in vertical position makes the invention adaptable to ease downward loads when the stand or leg structure is released by some other mechanical holding or locking structure. This can provide a safety feature to gradually ease the load downward.

The above described features make this device applicable to many products and/or equipment; the major group being performance equipment. Applications are in music stands, conductors' stands, microphone stands, lighting stands for both ambient lighting for homes and offices, and professional lighting stands used in lighting the areas of theatrical performances and photographic studios. Other related performance equipment being speaker stands, instrument stands, stools, chairs, instrument holders and musical accessory holders. Also, this invention can be incorporated in computer equipment stands, camera tripods, display devices such as advertising easels or signage posts, survey equipment (tripods) and artist easels for both working and display.

A further object of the invention is to provide, in combination, a stand and a self-locking slider mechanism comprising, an outer tubular member, a floor support secured to the lower end of the outer tubular member, an inner tubular member telescopically adjustable within the outer tubular member, a desk attached to the upper end of the inner tubular member, the improvement comprising, a friction means on the inner tubular member engaging the outer tubular member for releasably holding the inner and outer tubular members in adjusted position, said friction means enabling telescopic adjustment of said tubular members by a manual force applied lengthwise of said tubular members, and means mounting the friction means to require a greater manual force when lowering the stand than when raising the stand.

With the invention disclosed herein, the stand is self-locking and can be adjusted with a minimum of pushing or pulling force lengthwise of the stand while providing a high load-carrying capacity in performance position. The self-locking slider mechanism is a self-contained subassembly and has components which can be simply changed to vary the amount of load-carrying capacity of the stand as well as the required force for achieving height adjustment.

DESCRIPTION OF THE PREFERRED EMBODIMENT

Figure 1:
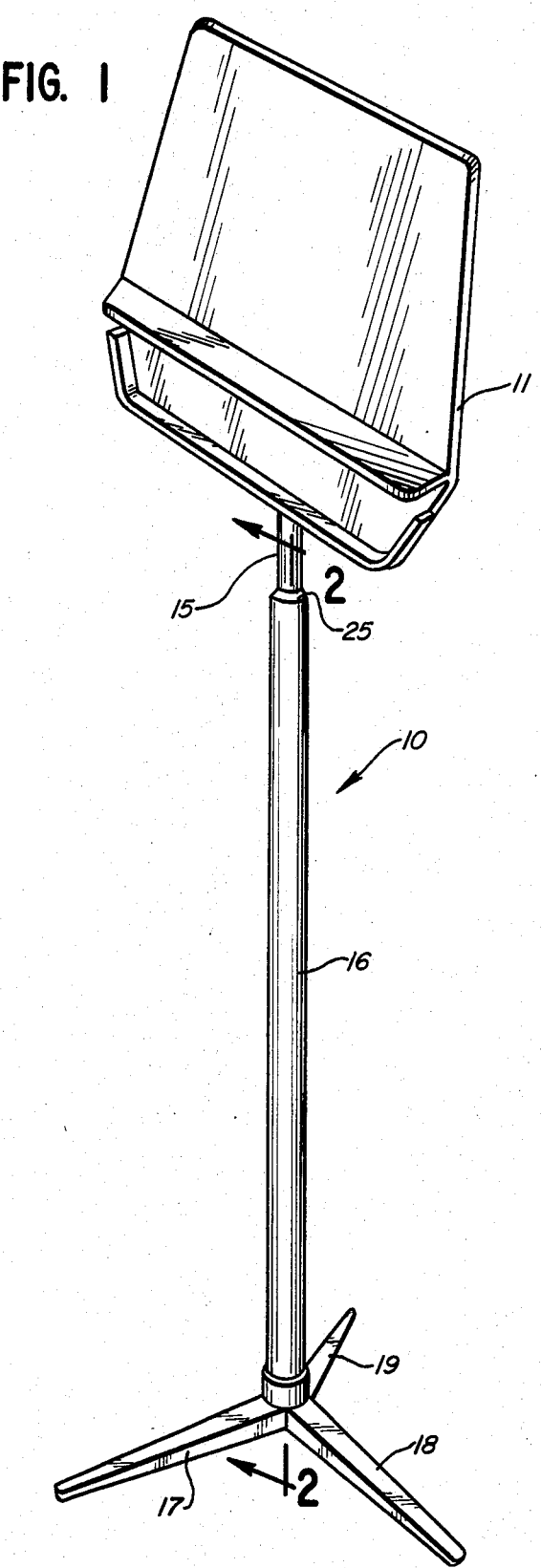
FIG. 1 is a perspective elevational view of a music stand, illustrating one use of the slider mechanism.

A stand using the slider mechanism embodying the invention is shown in FIG. 1 and indicated generally at 10. The stand is illustrated as a music stand having a music desk 11 at the upper end thereof. However, the principles of the invention can be embodied in stands of other types, such as microphone and light stands as well as adjustable leg structures. Reference to a stand is for illustrative purposes only.

The stand has a pair of relatively adjustable members 15 and 16 which are adjustable lengthwise of each other to establish the height of the stand. As shown, these members are an inner tubular member 15 and an outer tubular member 16 which are telescopically adjustable with respect to each other. The inner tubular member 15 mounts the music desk 11 by means well known in the art, such as a releasably-locked, pivot mounting. The outer tubular member 16 is fixed to a base at its lower end, with the base having the legs 17, 18 and 19.

Figure 2:
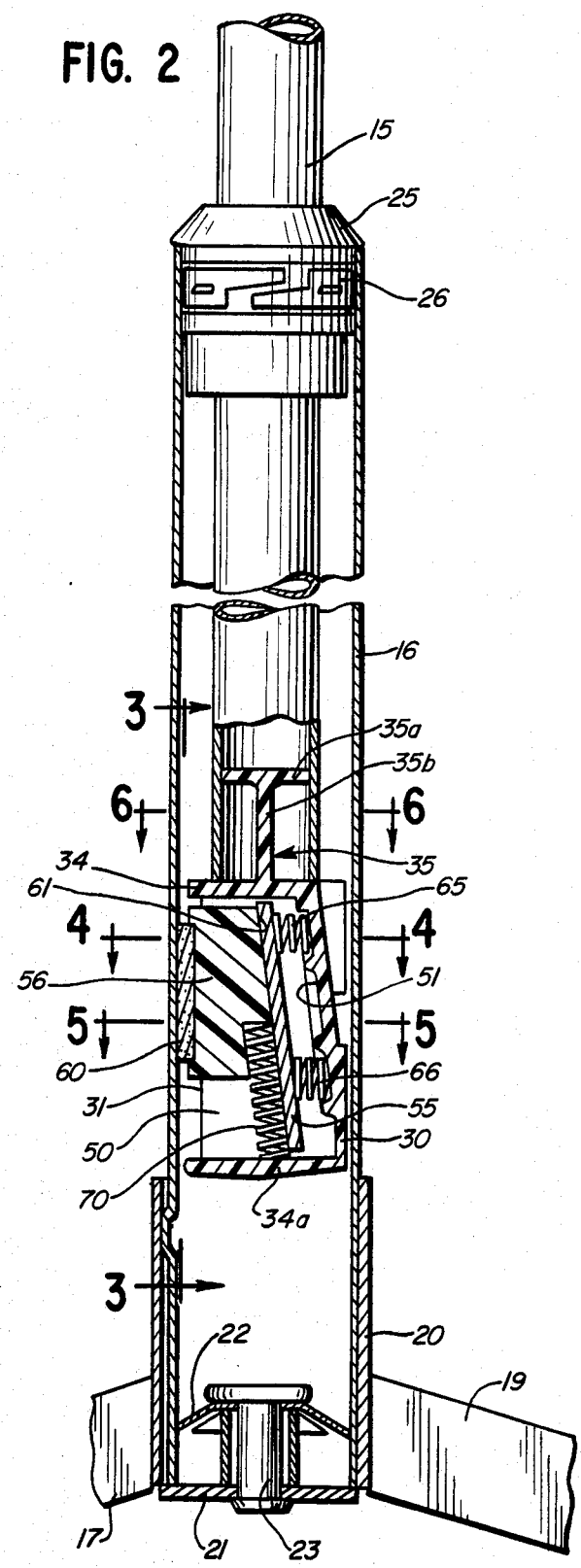
FIG. 2 is a fragmentary vertical section, on an enlarged scale of the music stand shown in FIG. 1.

The connection of the base to the outer tubular member 16 is shown particularly in FIG. 2 and is a structure known in the art wherein a collar 20 secured to the legs surrounds the lower end of the outer tubular member 16 and has an end plate 21 mounting a member having a series of downwardly-inclined spring fingers 22 and which is held thereto by a rivet 23 to permit insertion into the open lower end of the outer tubular member and with the spring fingers retaining the structure in assembled relation.

The inner tubular member 15 is guided in its movement relative to the outer tubular member 16 by a tubular guide 25 mounted within the upper end of the outer tubular member 16 and having a central opening through which the inner tubular member extends. The tubular guide 25 is a structure known in the art wherein a pair of semi-circular members, formed of a suitable plastic, are assembled together to form an annular member positioned within the upper end of the outer tubular member and which are held in assembled relation by a surrounding retainer clip 26 having angled spring grippers that engage into the outer tubular member 16. The tubular guide 25 has an opening of a size to receive wedge-defining surfaces on the inner tubular member 15 to spread apart the pair of semicircular members of the tubular guide to cause the angled spring grippers to press into the outer tubular member and prevent pullout of the tubular guide. The tubular guide can be pried out, if necessary, by use of a suitable tool when the enlargement is not positioned therein.

Figure 3:
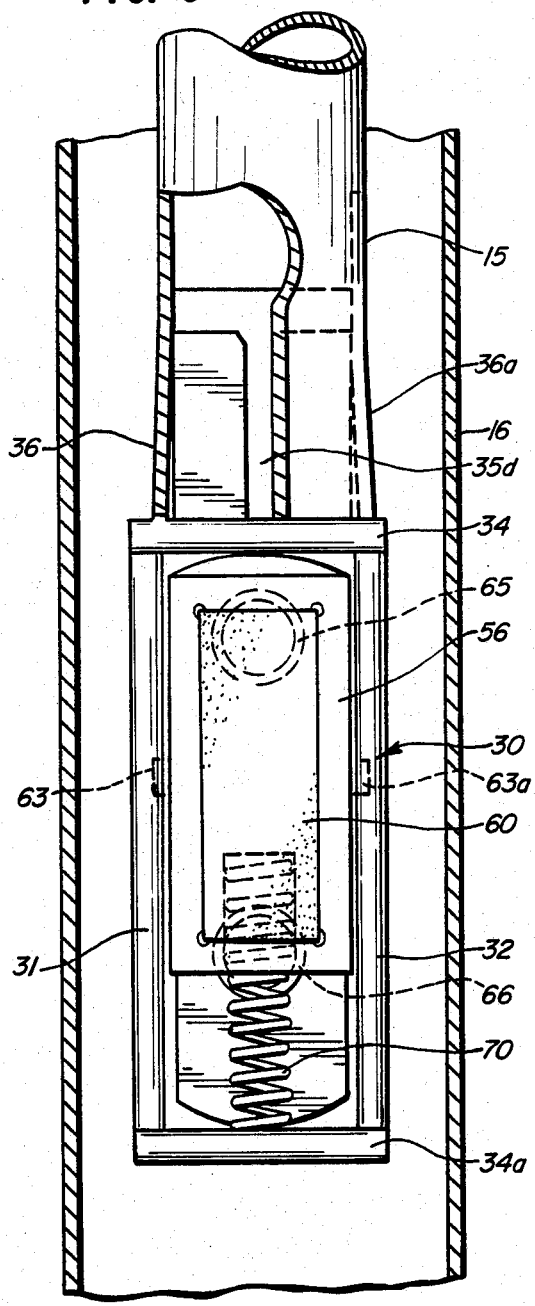
FIG. 3 is a fragmentary vertical section on a further enlarged scale, taken generally along the line 3—3 in FIG. 2.
Figure 4:
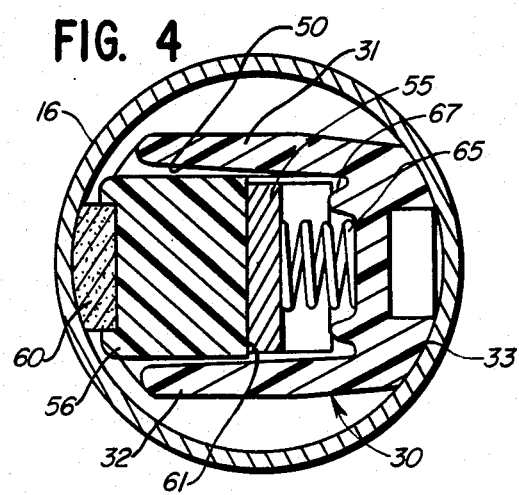
FIG. 4 is a transverse section on an enlarged scale taken generally along the line 4—4 in FIG. 2.

The self-locking slider mechanism is carried at the lower end of the inner tubular member 15 and is shown particularly in FIGS. 2–6. This slider mechanism has a body member 30 which is in the form of an elongate member preferably formed of a rigid relatively slippery plastic. As seen in FIG. 4, the body member 30 has a curved exterior side 33 and a pair of opposite slightly diverging flat sides 31 and 32 with a recess 50 between top and bottom walls 34 and 34a.

Figure 6:
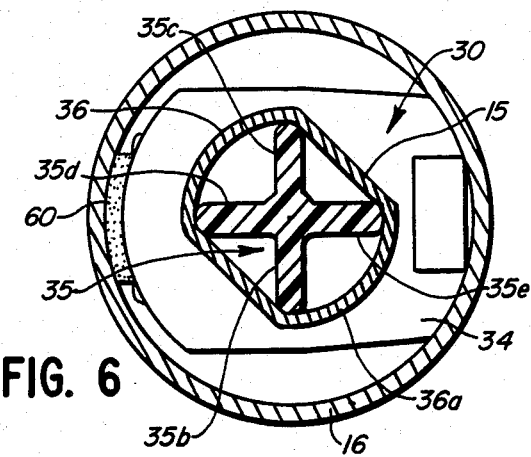
FIG. 6 is a transverse section on an enlarged scale taken generally along the line 6—6 in FIG. 2.

The body member 30 is fixed to the inner tubular member 15 by staking an end of the inner tubular member onto an attaching element 35 integral with an end of the body member. As seen in FIG. 2, the attaching element 35 has a round end flange 35a and a connecting section formed of four ribs 35b–e at adjacent right angles (FIGS. 2 and 6). The staking of these two parts together by an oppositely applied compressive force below the end flange 35a locks the body member to the inner tubular member with the inner tubular member being widened in one direction and narrowed in the other, as seen in FIGS. 3 and 6. The widened part has curved sides 36 and 36a forming a tapered enlargement greater than the diameter of the inner tubular member to effectively form the wedge, previously referred to, when the inner tubular member 15 has moved to an upper limit position.

Figure 5:
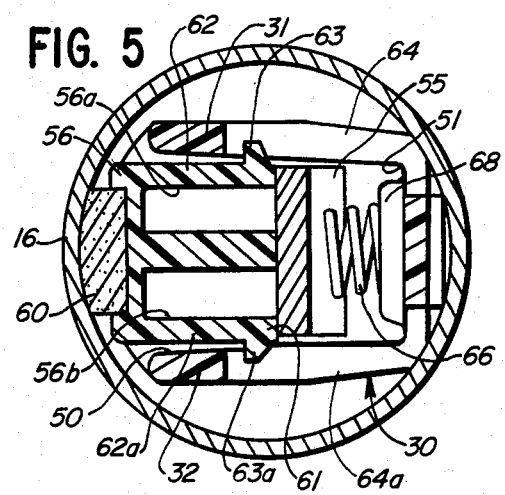
FIG. 5 is a transverse section on an enlarged scale taken generally along the line 5—5 in FIG. 2.

The body member 30 has the elongate internal recess 50 extending lengthwise thereof and which opens to one side thereof as seen in FIGS. 4 and 5. An inclined wall 51 defines the bottom of the internal recess 50 and, as seen in FIG. 2, this wall inclines upwardly and outwardly relative to the internal recess. A ramp plate 55 of rigid material, such as metal, is positioned within the elongate internal recess 50 and extends for substantially the entire length thereof and is in spaced parallel relation with the inclined wall 51. An elongate upwardly tapering ramp member 56, having a width closely approximating the width of the internal recess 50 and a length approximately half the length of the internal recess, is mounted within the internal recess for guided movement along the length thereof, as well as along the ramp plate 55 which engages the inner side thereof. The ramp member 56 has an insert 60 of friction material extending from an outer face for engagement with the inner surface of the wall of the outer tubular member 16 and also has a sloped inner face 61 engaging the ramp plate.

The ramp member 56 has a pair of central recesses 56a and 56b defining a pair of flexible legs 62 and 62a with protrusions 63 and 63a, respectively, to snap into grooves 64 and 64a in the walls 31 and 32 of the body member to movably retain the ramp member in association with the body member after assembly together to facilitate assembly with the inner and outer tubular members.

A pair of relatively stiff compression springs 65 and 66 are positioned between the inclined wall 51 of the body member and the ramp plate 55, with these springs being held in position by annular raised ribs 67 and 68 formed integrally with the inclined wall 51. A third less stiff compression spring 70 extends between the bottom wall 34a of the body member 30 and the ramp member 56, with a portion of the length of the spring being captured within an interior opening of the ramp member 56 as seen in FIG. 2.

The components of the slider mechanism are assembled with relatively tight tolerances whereby the slider mechanism, when assembled with the stand components, has the ramp member 56 positioned generally as shown in FIGS. 2 and 3 wherein the ramp member is at a short distance from an upper end of the internal recess 50. In this position, the pair of compression springs 65 and 66 are slightly compressed, as is the third compression spring 70. This provides sufficient pressure of the friction material 60 against the inner surface of the wall of the outer tubular member 16 to retain the music stand in an adjusted height position. The components are also selected and sized to provide sufficient pressure and, therefore, frictional resistance, whereby the desk 11 of the stand can support a load such as, for example only, the musical scores of a performer.

If the height of the stand is to be adjusted upwardly, a relatively small amount of force is required after application of sufficient thrust to achieve initial breakaway of the holding action by the slider mechanism, since the pressure applied by the friction insert 60 will be reduced because of the ramp member 56 moving inwardly of the internal recess 50 as permitted by the downward inclination of the ramp plate 55, the sloped surface 61, and the relatively weak spring 70. More particularly, manual force applied lengthwise of the stand by engaging of the inner tubular member 15 and holding of the outer tubular member 16 will cause outward movement of the inner tubular member and, as this movement occurs, the ramp member 56 and friction insert 60 are substantially free to move downwardly and inwardly relative to the inner tubular member to a position where less pressure is applied against the inner surface of the outer tubular member wall. Although minimal force is desirable for increasing the height of the stand, the components are selected and designed to assure that the stand tubular members will not separate if the stand is picked up by the desk 11 or by the inner tubular member 15.

When the desired height is achieved, the ramp member will again be positioned, as shown in FIG. 2, to retain the stand in adjusted position. The resistance to downward height adjustment of the stand is because of such movement tending to move the ramp member 56 further upwardly in the elongate internal recess 50 which is in a direction upwardly of the inclined ramp plate 55. The ramp plate can move inwardly to permit this upward movement, but such movement is resisted by the relatively stiff compression springs 65 and 66. The force of these springs is selected so that a predetermined amount of downward force exerted lengthwise of the stand and on the inner tubular member 15 will overcome the force of the springs adequately to permit relative movement between the friction insert 60 and the outer tubular member 16.

It will be evident there could be changes in the structure to vary the amount of force required to decrease the height of the stand. There could be a change in either the thickness of the ramp plate 55, the characteristics of the friction insert 60 or the strength of the springs. The force to increase the length or height of the stand will go up proportionally to the force required to decrease the height of the stand.

The slider mechanism requires a greater force manually applied lengthwise of the stand to decrease the length of the stand than to increase the length of the stand and the breakaway force required preparatory to increasing the height of the stand is adequate to assure that the tubular members will not separate when the stand is picked up by the inner tubular member 15.

As pointed out in the SUMMARY OF THE INVENTION, the slider mechanism is usable with many different types of stands and adjustable leg structures and is not limited to use only with a music stand which is shown in FIG. 1 and described for illustrative purposes only.

We claim:

1. A slider mechanism for holding telescoping relatively movable inner and outer tubular members in adjusted lengthwise position comprising, a body with an elongate interior recess opening to a side thereof and having means for attachment thereof to an end of the inner tubular member, an inclined ramp plate within said interior recess and extending lengthwise thereof, a ramp member movably mounted in said recess for movement along the ramp plate and having friction material on an outer face for engagement with the inner surface of the outer tubular member, first spring means urging said ramp member to a position at one end of the inclined ramp plate, and second spring means urging said ramp plate outwardly of said recess.

2. A slider mechanism as defined in claim 1 wherein said ramp plate is inclined in a direction and the first spring means located to permit movement of the ramp along and inwardly of the interior recess in response to relative movement of the inner and outer tubular members in an extension direction.

3. A slider mechanism as defined in claim 1 wherein said ramp plate is inclined in a direction to require a force to telescopically contract said inner and outer tubular members greater than the force to extend said inner and outer tubular members.

4. A self-locking slider mechanism for frictionally holding telescoped movable inner and outer tubular members in adjusted position relative to each other and with manually applied force adjusting the relation therebetween comprising, means including a floating ramp plate and a floating ramp member movably carried by the inner tubular member, said ramp member operatively engaging the interior of the outer tubular member to frictionally hold the tubular members in adjusted position and spring-urged means yieldably holding the ramp member to apply pressure against the outer tubular member and require a greater force to contract the tubular members than to extend the tubular members.

5. A self-locking slider mechanism as defined in claim 4 wherein said tubular members define an upright stand having a structure at the upper end thereof with said applied pressure being of a value to hold said structure and any material supported thereon at a desired height.

6. A self-locking slider mechanism as defined in claim 4 including relatively stiff spring means resisting movement of the ramp member away from the outer tubular member and less stiff spring means resisting movement of the ramp member lengthwise of the inner tubular member.

7. A self-locking slider mechanism as defined in claim 6 including a body with a recess secured to said inner tubular member with said ramp member movably mounted in said recess, and said ramp plate being inclined in the recess along which the ramp member can move, and said relatively stiff spring means engaging said inclined ramp plate to resist movement of the inclined ramp plate inwardly of the recess.

8. A self-locking slider mechanism for an outer tubular member and an inner tubular member telescopically adjustable within the outer tubular member, comprising, friction means on the inner tubular member engaging the outer tubular member for releasably holding the inner and outer tubular members in adjusted position, said friction means enabling extending and retracting telescopic adjustment of said tubular members by a manual force applied lengthwise of said tubular members, and means mounting the friction means to require differing amounts of force dependent on the direction of relative movement of said members.

9. The mechanism set forth in claim 8 wherein said friction means comprises a ramp member, and said mounting means includes an inclined ramp plate along which the ramp member moves.

10. The mechanism set forth in claim 9 wherein said mounting means includes a first spring urging the ramp member toward an end of the ramp plate, said ramp plate being movable, and stiffer spring means supporting the ramp plate against movement.

11. In combination, an adjustable stand and a self-locking slider mechanism to releasably hold the stand in adjusted position, said stand having inner and outer tubular members telescopically related and either extendable or contractable lengthwise to adjust the height of the stand, said slider mechanism comprising a body secured to an end of the inner tubular member and having an elongate recess lengthwise thereof opening to a side of the body, a ramp member movably guided in the elongate recess for movement lengthwise thereof and having a friction surface to engage the outer tubular member, an elongate ramp plate in said elongate recess, relatively stiff spring means supporting said ramp plate in an inclined position to have the elongate ramp plate closer to the side of the body near the top of the body and cause sufficient pressure on the elongate ramp plate and ramp member to cause said friction surface to hold the stand in adjusted position and with the pressure increasing when the height of the stand is decreased, and additional spring means less stiff than the first-mentioned spring means resisting movement of the ramp member along the elongate recess and the elongate ramp plate to a position wherein less pressure is exerted on the ramp member and friction surface to permit increasing the height of the stand with minimal force.

12. A combination as defined in claim 11 wherein said outer tubular member has a tubular guide mounted therein at its upper end, a retainer clip surrouding said tubular guide with means to engage the outer tubular member, and a wedge shape on the inner tubular member movable into the tubular guide to force the retainer clip radially outward.

13. A self-locking slider mechanism for frictionally holding a pair of telescopically adjustable inner and outer tubular members in adjusted position comprising, a generally cylindrical body member having an internal recess extending lengthwise thereof and opening to one side of the body, an inclined wall defining the bottom of the internal recess, a ramp plate movably positioned in the internal recess and extending in spaced parallel relation to said inclined wall to have an inclination relative to said body member, a pair of compression springs positioned between said inclined wall and the ramp plate, a ramp member movably guided in said internal recess and movable along the ramp plate and having a length approximately equal to half the length of the internal recess, and a third compression spring positioned between an end of the internal recess and the ramp member urging the ramp member upwardly of the inclined ramp plate.

14. A self-locking slider mechanism as defined in claim 13 wherein said ramp member is of a relatively slippery plastic and a layer of friction material on an exterior surface thereof.

15. A self-locking slider mechanism as defined in claim 13 wherein said pair of compression springs are stiffer than said third compression spring.

16. A self-locking slider mechanism as defined in claim 13 wherein said body member is of plastic, and means integral with said body member to which the inner tubular member is staked.

17. A self-locking slider mechanism for frictionally holding a pair of adjustable members of a stand in adjusted height position comprising, a friction member carried by one member and frictionally engageable with the other member, and means mounting the friction member for non-wedging action in response to a force increasing the length of the stand and for wedging action in response to a force acting in a direction to decrease the length of the stand, and means enabling movement of the friction member in a direction transverse to the height of the stand when exerting a wedging action to reduce the effect thereof and enable a manually-applied force to shorten the length of the stand.

* * * * *